US011093908B2

(12) United States Patent
Mathew (10) Patent No.: US 11,093,908 B2
(45) Date of Patent: Aug. 17, 2021

(54) ROUTING TRANSACTIONS TO A PRIORITY PROCESSING NETWORK BASED ON ROUTING RULES (71) Applicant: MASTERCARD INTERNATIONAL INCORPORATED, Purchase, NY (US)

(72) Inventor: Bejoy Lucy Mathew, Dardenne Prairie, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 50 days.

(21) Appl. No.: 16/118,145

(22) Filed: Aug. 30, 2018

(65) Prior Publication Data
US 2020/0074416 A1 Mar. 5, 2020

(51) Int. Cl.
G06Q 20/02 (2012.01)
G06Q 20/24 (2012.01)
G06Q 20/20 (2012.01)

(52) U.S. Cl.
CPC .......... *G06Q 20/027* (2013.01); *G06Q 20/24* (2013.01); *G06Q 20/208* (2013.01)

(58) Field of Classification Search
CPC ..... G06Q 20/027; G06Q 20/24; G06Q 20/208
See application file for complete search history.

(56) References Cited

U.S. PATENT DOCUMENTS

| | | | | |
|---|---|---|---|---|
| 8,596,527 B2* | 12/2013 | Bishop | ................... | G06Q 20/02 235/379 |
| 10,795,886 B1* | 10/2020 | Samdani | ........... | G06F 16/24539 |
| 2003/0055783 A1* | 3/2003 | Cataline | ................ | G06Q 20/00 705/40 |
| 2003/0145111 A1* | 7/2003 | Derou-Madeline | ..... | H04L 45/06 709/244 |
| 2005/0027648 A1* | 2/2005 | Knowles | .............. | G06Q 20/381 705/38 |
| 2010/0211445 A1* | 8/2010 | Bodington | ........... | G06Q 20/102 705/14.17 |
| 2012/0130897 A1* | 5/2012 | Chisholm | .............. | G06Q 20/40 705/44 |
| 2015/0112871 A1* | 4/2015 | Kumnick | ........... | G06Q 20/4012 705/67 |

(Continued)

Primary Examiner — Mike Anderson
Assistant Examiner — Matthew Cobb (57) ABSTRACT The disclosure herein describes receiving, analyzing, and routing a transaction to a priority processing network based on routing rules. A transaction message associated with an electronic credit transaction is received, the transaction message including transaction data. Routing rules are accessed from a routing rules data store and at least one category of the electronic credit transaction is determined based on the transaction data. A routing score is calculated based on an application of the routing rules to the at least one category. Based on the calculated routing score, the transaction message is routed to a priority processing network, wherein processing the electronic credit transaction by the priority processing network includes a direct funds transfer between a payer account and a payee account. The described system provides flexible, efficient routing of transactions to the priority processing network for rapid processing based on the preference for or urgency of the transactions.

20 Claims, 5 Drawing Sheets (56) References Cited

U.S. PATENT DOCUMENTS

2015/0195126 A1* 7/2015 Vasseur .................. H04L 45/02
                                                    370/218
2018/0246924 A1* 8/2018 Altaf ....................... G06F 17/30
2020/0162371 A1* 5/2020 Musku .................... H04L 45/20

* cited by examiner

ROUTING TRANSACTIONS TO A PRIORITY PROCESSING NETWORK BASED ON ROUTING RULES

BACKGROUND

The processing of electronic credit transactions takes place over the course of several different stages (e.g., authentication, clearing, settlement, etc.) and it typically takes several days to a week for a merchant or other payment receiving entity to receive the funds of a transaction in a bank account. The process includes communications between issuing banks (e.g., banks that issue credit to the payers, etc.) and acquiring banks (e.g., banks that provide accounts to merchants, etc.) via a payment network. While the stages of processing may provide an effective means of transferring funds for many different types of transactions, for some merchants or other payment receiving entities, the time required for processing may be inconvenient, or even create hardship for merchants that need immediate access to funds from the processed transactions. For instance, some payment receiving entities, such as charitable organizations and/or disaster relief organizations may have an urgent need of funding to operate effectively, and the processing time required for electronic credit transactions may hamper such operations significantly.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for routing transactions to a priority processing network is described. A transaction message associated with an electronic credit transaction is received via a network interface, the transaction message including transaction data. Transaction routing rules are accessed from at least one routing rules data store and at least one category of the electronic credit transaction is determined based on the transaction data. A routing score of the electronic credit transaction is calculated based on an application of the transaction routing rules to the at least one category. Based on the calculated routing score, the transaction message is routed to a priority processing network via the network interface, wherein processing the electronic credit transaction by the priority processing network includes a direct funds transfer between a payer account and a payee account identified in the transaction data.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide a system and method for receiving, analyzing, and routing transaction messages to a priority processing network based on associated routing rules. A transaction message associated with an electronic credit transaction is received at a payment network. The transaction may have been initiated from a merchant point-of-sale, a merchant website, or the like. Upon receipt of the transaction message, transaction routing rules are accessed for use by the payment network in routing the transaction message. The electronic credit transaction is categorized based on transaction data of the transaction message and a routing score is calculated based on applying the routing rules to the categories of the transaction. If the routing score exceeds a routing threshold, the transaction message is routed to a priority processing network by the payment network. The processing of the electronic credit transaction by the priority processing network may include a direct or otherwise rapid funds transfer between accounts of the payer and the merchant.

The described transaction routing system provides a tool for selectively bypassing standard credit transaction processing in order to accelerate the completion of the transaction. The selection of transactions to route to the priority processing network is based one a variety of routing rules that may be custom designed in a flexible manner, including rules based on categories of a transaction, layered rules that trigger the evaluation of other rules, rules that depend on data from external data sources, and the like. The processor, memory, and network interface(s) of the transaction routing system operate in an unconventional way to enable the prioritized processing of transactions based on classification and/or urgency of the transactions wherein data values from internal data sources and/or external data sources may be considered in determining whether to route a transaction to the priority processing network. The operations described herein improve the functioning of a computing device through expedited processing of the transaction.

Figure 1:
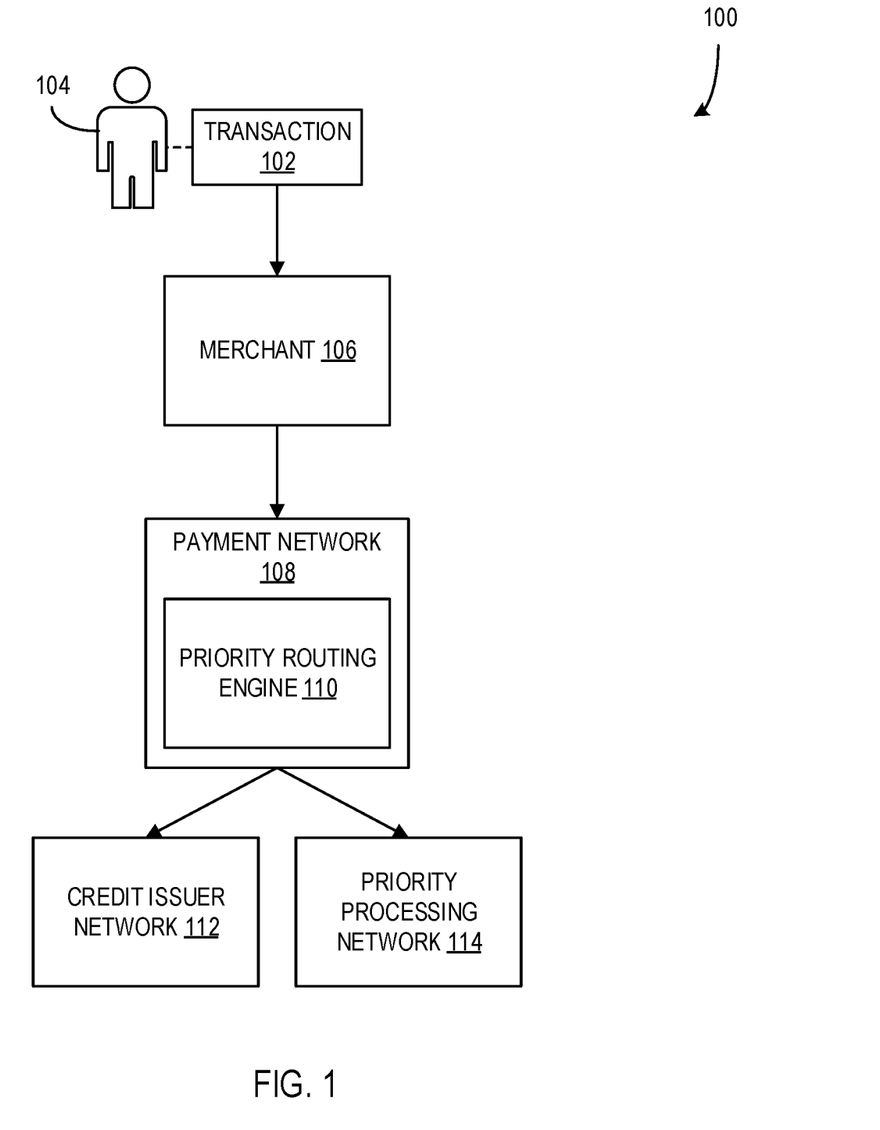
FIG. 1 is an exemplary block diagram illustrating a system configured for prioritizing the processing of electronic transactions according to an embodiment.

FIG. 1 is an exemplary block diagram illustrating a system 100 configured for prioritizing the processing of electronic transactions according to an embodiment. The system 100 includes a transaction 102 associated with a payer 104 making a purchase from a merchant 106. The transaction 102 may take place at a store or other physical location of the merchant 106, with an employee or other party associated with the merchant 106 accepting payment from the payer 104 using a point-of-sale (POS) device or the like. Alternatively, the transaction 102 may take place via an online store website, web application, or other electronic interface with the merchant 106, including the payer 104 providing payment information to the merchant 106 for use in processing the transaction 102.

In some examples, the transaction 102 is an electronic credit transaction associated with a payment account (e.g., a credit card account, etc.) of the payer 104. The transaction 102 may be initiated by a POS device reading the payer's credit card (e.g., reading a magnetic strip of the credit card, interacting with a readable chip embedder in the credit card, a near field communication (NFC) scan of the card, etc.), by the payer 104 providing a card number and/or account number and other information (e.g., an expiration date of the card, a verification code of the card, etc.) via a computer interface or other electronic interface, etc. The transaction 102 may be initiated by any process or method understood by a person of ordinary skill in the art without departing from the description herein.

The system further includes a payment network 108 configured for facilitating electronic transactions, such as transaction 102, between payers and payees. The payment network 108 (e.g., MASTERCARD, etc.) may include a company or similar entity that facilitates electronic transactions associated with accounts of users, companies, or the like through the use of servers or other computing devices. Through the facilitation of transactions, the payment network 108 records transaction data to a transaction data store. In some examples, the payment network 108 also provides transaction data for use by the priority routing engine 110 as described herein. Transaction data stored by the payment network 108 may include, for instance, account identifiers for parties of the transactions, date/time data, location data of the transactions, transaction category data, etc.

The priority routing engine 110 is configured for routing electronic transactions to either a credit issuer network 112 or a priority processing network 114 depending on an analysis of information associated with the transaction 102 as described herein. The priority routing engine 110 may include hardware, firmware, and/or software configured to receive transaction data, analyze the transaction data and other associated data, and route the transaction based on the analysis. The operation of the priority routing engine 110 is described in greater detail below with respect to FIGS. 2-4. While the priority routing engine 110 is illustrated as being a part of the payment network 108, in alternative examples, the priority routing engine 110 may be part of another component of the system 100 or it may be separate from other components in the system 100 without departing from the description herein.

The payment network 108, via the priority routing engine 110, may route the transaction to either the credit issuer network 112 or the priority processing network 114. The credit issuer network 112 is associated with the issuer of the payer 104's account in use for the transaction 102 and any credit transaction processing infrastructure as would be understood by a person of ordinary skill in the art. Processing the transaction 102 using the credit issuer network 112 may include authorization, clearing, and settlement of the transaction 102. The processing by the credit issuer network 112 may result in the merchant 106 receiving funds for the transaction 102 during the settlement phase, one or more days after the transaction 102 takes place.

Alternatively, the transaction 102 may be routed to the priority processing network 114. The priority processing network 114 is configured to rapidly process the transaction 102 such that the funds for the transaction reach the merchant 106 more quickly than via the credit issuer network 112. In some examples, the priority processing network 114 may be configured to process the transaction 102 in a same-day timeframe (e.g., payments using processing like Automated Clearing House (ACH) debit transaction processing, etc.) or even in a substantially immediate timeframe (e.g., VOCALINK real time payments, etc.).

Figure 2:
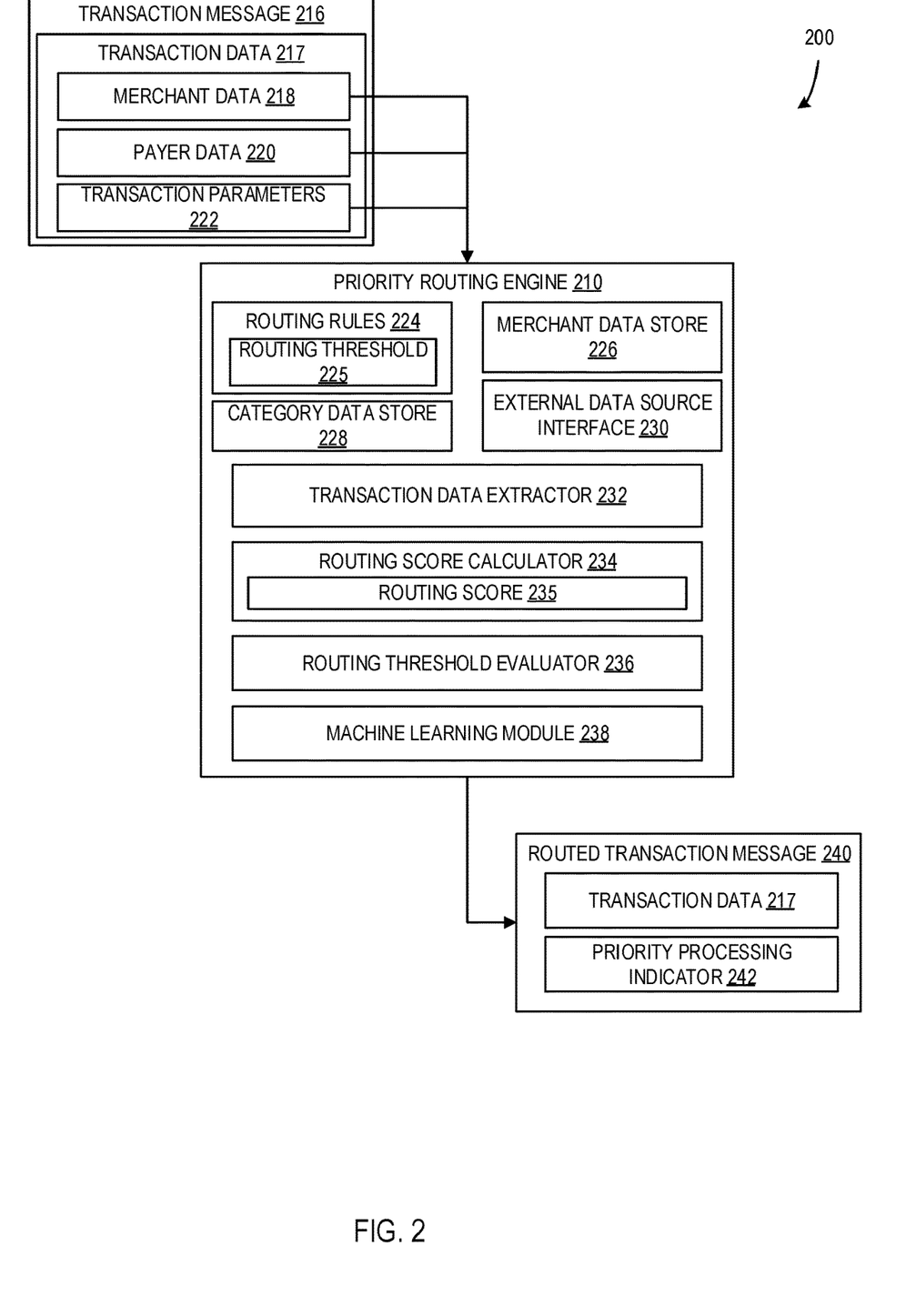
FIG. 2 is an exemplary block diagram illustrating a priority routing engine configured for routing electronic transactions to a priority processing network based on a calculated routing score according to an embodiment.

FIG. 2 is an exemplary block diagram 200 illustrating a priority routing engine 210 configured for routing electronic transactions to a priority processing network based on a calculated routing score according to an embodiment. The priority routing engine 210 is configured to receive a transaction message 216 associated with an electronic credit transaction (e.g., transaction 102, etc.). The transaction message 216 includes transaction data 217, which may specifically include merchant data 218, payer data 220, and/or transaction parameters 222. Upon receipt of the transaction message 216, the priority routing engine 210 is configured to analyze the transaction data 217 and route the transaction message as a routed transaction message 240 which includes the transaction data 217 and a priority processing indicator 242 as described herein.

The merchant data 218, payer data 220, and transaction parameters 222 include data points associated with the electronic credit transaction of the transaction message 216. The merchant data 218 may include data values associated with the merchant of the transaction, such as a merchant identifier, a specific store identifier (e.g., an identifier of a specific store for a merchant with multiple stores, etc.), a merchant location, merchant type or category information, merchant account number or identifier, etc. The payer data 220 may include data values associated with the payer (e.g., a customer, consumer, or other person or party making a purchase, etc.) of the transaction, such as a payer account number or identifier, a payer identifier, a payer relationship with the merchant, type or category information of the payer, etc. The transaction parameters 222 include other data values associated with the transaction, such as the transaction amount, a transaction date-time value, transaction location data, transaction type or category information, information describing the goods or services being purchased in the transaction, etc. The transaction data 217 is transmitted to the priority routing engine 210 within the transaction message 216 as described herein.

The priority routing engine 210 includes routing rules 224 and a routing threshold 225 that are configured to be applied to transaction data 217 of a transaction in order to evaluate how the transaction should be routed. A merchant data store 226, a category data store 228, and an external data store interface 230 provide access to data that is used in the evaluation of the transaction data 217 by applying the routing rules 224. The priority routing engine 210 further includes a transaction data extractor 232, a routing score calculator 234 configured to calculate a routing score 235, a routing threshold evaluator 236, and a machine learning module 238 configured for performing subsets of the operations of the priority routing engine 210 described herein.

The routing rules 224 include rules (e.g., business rules, logical rules, etc.) stored in a data store (e.g., a database, data file or files, etc.) that are evaluated based on portions of the transaction data 217 and/or other data from associated data stores (e.g., merchant data store 226, category data store 228, external data stores accessed via the external data store interface 230, etc.). The results of evaluating routing rules 224 may be used when calculating a routing score 235 by the routing score calculator 234. The routing rules 224 further include at least one rule associated with a routing threshold 225 that is compared to a calculated routing score 235 to determine how to route the transaction.

The merchant data store 226 is a data store (e.g., a database, data file or files, etc.) storing merchant data that may be used by the priority routing engine 210 in routing transactions. The merchant data store 226 may include lists or other groupings of merchant identifiers that are categorized with respect to the priority routing process described herein. For instance, the merchant data store 226 may include a preferred merchant list of merchant identifiers indicating merchants that cause associated transactions to be routed to the priority processing network or otherwise increase the likelihood that associated transactions will be routed to the priority processing network. A preferred merchant list may be defined, updated, or otherwise edited by a user upon configuration of the priority routing engine 210. In some examples, the merchants on a preferred merchant list may be added to the preferred merchant list as a service of the payment network of the priority routing engine 210. Additionally, or alternatively, other types of merchant identifier lists or groups may be stored in the merchant data store 226. Such lists or groups of merchant identifiers may be compared to the merchant data 218 of the transaction to categorize the transaction based on the known merchant of the transaction.

Further, the merchant data store 226 may include past transaction routing information associated with merchant identifiers that may be used to identify patterns of transaction routing for use in calculating routing score 235 and/or updating routing rules 224 by the machine learning module 238 as described below.

The category data store 228 is a data store (e.g., a database, data file or files, etc.) storing other transaction category data that may be used by the priority routing engine 210 in routing transactions. The other transaction category data may be associated with a type of transaction (e.g., transactions for staple goods such as groceries as compared to transactions for luxury goods, donations to charitable causes and/or disaster relief funds, etc.), location of the transaction, amount of the transaction, a payer identifier associated with the transaction, user-defined categories, or the like. The transaction category data of the category data store 228 may be compared to the transaction data 217 of the transaction message 216 to determine a category or categories in which the transaction fits, which may then be used by the priority routing engine 210 in applying the routing rules 224.

The external data source interface 230 may include hardware, firmware and/or software configured for communicating with external data sources to obtain and/or provide data values associated with transactions for use by the priority routing engine 210 in calculating routing scores and routing associated transactions as described herein. The interfaces may enable communication over one or more networks. In some examples, data values that are needed to evaluate the routing rules 224 may be available from data sources that are external to the priority routing engine 210 (e.g., websites, databases, social networks/media sources, etc.). The external data source interface 230 may include one or more application program interfaces (APIs) and it may be configured to make use of APIs that are exposed by the external data sources from which the priority routing engine 210 obtains data values. For instance, the priority routing engine 210 may request information from a merchant about a payer to determine whether the payer is a "trusted customer" of the merchant according to the merchant's database. The priority routing engine 210 may transmit the request via the external data source interface 230 to an API exposed on a merchant server. In another example, the priority routing engine 210 may obtain data from a payer's public social network posts for use in determining whether to categorize a transaction as charitable giving.

The transaction data extractor 232 includes hardware, firmware, and/or software configured to extract, decrypt, and/or otherwise transform transaction data 217 from the transaction message 216 for use by the priority routing engine 210. In some examples, the transaction data extractor 232 is configured for extracting each of the merchant data 218, including a merchant identifier, the payer data 220, and the transaction parameters 222 from the transaction message 216 and temporarily storing the extracted data in a memory associated with the priority routing engine 210. The transaction message 216 may be received in an encrypted format or other format that is not usable by the priority routing engine 210 and the transaction data extractor 232 may be configured to transform the transaction data 217 into a usable format. Further, the transaction data extractor 232 may combine data values of the transaction data 217 into complex data values or data objects to be used by the priority routing engine 210 (e.g., raw date, time, and/or location data values may be combined into a transaction context data object that may be accessed by other components of the priority routing engine 210, etc.).

The routing score calculator 234 includes hardware, firmware, and/or software configured to calculate a routing score 235 based on transaction data 217 and routing rules 224. The routing score calculator 234 may be configured to obtain extracted transaction data from the transaction data extractor 232 and apply multiple routing rules 224 to an intermediate routing score in a sequence to completely calculate the final routing score 235. For instance, the routing score calculator 234 may apply a first routing rule based on an extracted merchant identifier (e.g., the first routing rule indicates that a value of four should be added to the intermediate routing score of the transaction when the merchant identifier indicates the associated merchant is Merchant A, etc.). Then, a second routing rule is applied based on a transaction amount (e.g., the second routing rule indicates that a value of three should be added to the intermediate routing score of the transaction when the transaction amount is less than $5.00, etc.). A third routing rule may be applied based on an identity of the payer which was determined from the payer account information associated with the transaction (e.g., the third routing rule indicates that a value of five should be added to the intermediate routing score when the payer is on a "trusted payer" list in the category data store 228, etc.). A resulting routing score of twelve may then be compared to a routing threshold 225, which may be ten, for example, to determine how to route the transaction message 216 as described below.

In some examples, the routing rules applied to a transaction are a subset of the total routing rules 224 and that subset of rules may be determined based on a category of the transaction, a merchant identifier associated with the transaction, or the like. Further, the application of a rule may result in the increase or decrease of an associated intermediate routing score (e.g., some rules, when satisfied, adjust the routing score to make it more likely that the transaction will be routed for priority processing, while other rules, when satisfied, adjust the routing score to make it less likely that the transaction will be routed for priority processing, etc.). Satisfaction of some routing rules 224 may result in automatically routing the transaction for priority processing (e.g., a preferred merchant may have all transactions routed for priority processing, etc.). Alternatively, or additionally, satisfaction of some routing rules 224 may result in automatically preventing the transaction from being routed for priority processing (e.g., transactions associated with a payer with a history of non-payment may be prevented from being routed for priority processing, etc.).

Routing rules 224 may adjust intermediate routing scores based on identifying healthcare-related transactions, transactions associated with preferred merchants, transactions associated with trusted payers and/or high-risk payers, charitable contribution transactions (e.g., contributions to food kitchens or other entities that may rely on rapid receipt of funds, etc.), disaster relief contribution transactions, low risk transactions (e.g., transaction amounts of less than a defined amount, etc.). In some examples, routing rules 224 may be nested or layered, such that satisfying a first routing rule may result in one or more other routing rules being applied to the transaction (e.g., identifying a merchant of the transaction and then applying merchant-specific routing rules to the transaction, etc.).

The routing threshold evaluator 236 includes hardware, firmware, and/or software configured to evaluate or compare a routing threshold 225 to a routing score 235 and to apply the result to a transaction message 216. The routing threshold evaluator 236 may be configured to access the routing threshold 225 from the routing rules data store or other associated data store of the priority routing engine 210 and access the routing score 235 from the routing score calculator 234 or an associated data store. In some examples, the routing threshold evaluator 236 is configured to compare the routing score 235 and the routing threshold 225 and, based on the comparison, apply a priority processing indicator 242 to an associated transaction message 216 to form a routed transaction message 240. For instance, the routing threshold evaluator 236 may be configured to apply a positive priority processing indicator 242 (e.g., a binary flag set to '1', etc.) to a transaction message 216 when the routing score 235 exceeds the routing threshold 225. In this case, a higher routing score 235 indicates a greater chance that the transaction will be routed for priority processing instead of standard credit transaction processing. The routing rules 224, upon being evaluated as described herein, may result in values being added to or otherwise increasing the resulting routing score 235 when satisfaction of the routing rules 224 indicates a greater likelihood of priority processing.

Alternatively, the routing threshold evaluator 236 may be configured to route the transaction message to priority processing when the routing score 235 is less than the routing threshold 225, within a defined range of the routing threshold 225, or upon having a different defined relationship with the routing threshold 225. It should be understood that, in alternative embodiments, routing a transaction message to priority processing may be triggered by different relationships between the routing score 235 and the routing threshold 225 without departing from the description herein.

In some examples, the routing rules 224 may include multiple routing thresholds 225. The determination of which routing threshold 225 to apply to a transaction may be based on the evaluation of the routing rules 224, an extracted merchant identifier, or other data value associated with the transaction. For instance, the priority routing engine 210 may include routing thresholds 225 for each known merchant represented in the merchant data store 226. The routing score 235 of a transaction is then compared to the routing threshold 225 associated with the merchant of the transaction. Merchants that have a preferred status may have a lower routing threshold 225 than a typical merchant. Alternatively, or additionally, merchants that tend to have less urgent transactions or transactions that are more likely to be fraudulent or otherwise unsuccessful in some way may have higher routing thresholds 225 than a typical merchant.

The priority processing indicator 242 set on the routed transaction message 240 by the routing threshold evaluator 236 may include a binary flag that indicates whether the transaction message should be routed to a priority processing network. Alternatively, or additionally, the priority processing indicator 242 may include a processing network identifier that indicates a particular processing network to which the transaction is routed. In some examples, there may be multiple processing networks available, and some processing networks may be specific to defined categories of transactions (e.g., a processing network specific to processing transactions associated with a disaster relief effort after a hurricane, etc.). The priority processing indicator 242 may include a specific processing network identifier as described above, a transaction category indicator, or a combination of data values that may be used by the payment network 208 in routing the transaction to the appropriate processing network.

In some examples, the routed transaction message 240 includes substantially the same transaction data 217 as the received transaction message 216 and further includes a priority processing indicator 242 as described above. The routed transaction message 240 may be transmitted, communicated, or otherwise sent to other components of the payment network 208 or other system components responsible for routing the transaction message 240 based on the included priority processing indicator 242.

The machine learning module 238 provides updates, changes, and/or adjustments to the routing rules 224 and/or the routing threshold 225 based on feedback from merchants, issuers, and/or other parties associated with transactions regarding the operation of the priority routing engine 210. The feedback, routing rules 224, routing thresholds 225, and other associated routing data may be analyzed to identify routing patterns that can be used by the machine learning module 238 and the priority routing engine 210 generally to route transactions efficiently and accurately. For instance, merchants may track the transactions that are prioritized over time and determine if any transactions should have been prioritized and were not and/or if any transactions were inappropriately prioritized. The merchants provide feedback regarding the accuracy of the prioritization to the payment network and associated priority routing engine 210 and the feedback is provided to the machine learning module 238. If the feedback indicates that the transactions of a merchant should have been prioritized more often, a routing threshold specific to the merchant may be adjusted down by a defined amount. Alternatively, if the feedback indicates that many of a merchant's transactions have been prioritized unnecessarily or inappropriately, the routing threshold 225 specific to the merchant may be adjusted up by a defined amount.

Additionally, or alternatively, feedback provided to the machine learning module 238 may be used to adjust the routing rules 224. For instance, feedback may indicate that transactions that are determined to be in a charitable giving category should be prioritized at a higher rate than they currently are. As a result, the machine learning module 238 may be configured to adjust a routing rule 224 that increases the routing score 235 when the transaction is in a charitable giving category such that the routing score 235 is increased by a larger amount.

In some examples, the machine learning module 238 comprises a trained regressor such as a random decision forest, directed acyclic graph, support vector machine, neural network, or other trained regressor. The trained regressor may be trained using the feedback data described above. Examples of trained regressors include a convolutional neural network and a random decision forest. It should further be understood that the machine learning module 238, in some examples, may operate according machine learning principles and/or techniques known in the art without departing from the systems and/or methods described herein.

In an example, the machine learning module 238 may make use of training data pairs when applying machine learning techniques and/or algorithms. Millions of training data pairs (or more) may be stored in a machine learning data structure. In some examples, a training data pair includes a feedback data value paired with a routing rule adjustment value and/or a routing threshold adjustment value. The pairing of the two values demonstrates a relationship between the feedback data value and the adjustment values that may be used by the machine learning module 238 to determine future routing rule adjustments and/or routing threshold adjustments according to machine learning techniques and/or algorithms.

In some examples, the machine learning module 238 may be located on another computing device with which the priority routing engine 210 is in communication, such as a server associated with a payment network or other entity. It should be understood that other arrangements of the modules and/or components in the priority routing engine 210 and related computing devices may be used without departing from the description herein.

In some examples, the priority routing engine 210 is configured to access a fraud indicator or other fraud-based data associated with a transaction from an external fraud data source (e.g., a fraud detection engine, etc.). The routing rules 224 may include rules that consider and/or evaluate obtained fraud data to calculate the routing score of a transaction. For instance, if the fraud data associated with a transaction indicates that the transaction is likely fraudulent, the routing score may be adjusted to make it less likely that the transaction will be routed to the priority processing network.

Additionally, or alternatively, the priority routing engine 210 may access transaction history data associated with a payer of the transaction in order to determine past transaction patterns of the payer. For instance, a routing rule may be based on a number of successfully completed transactions between the payer and merchant of the electronic credit transaction, such that, when a payer has had a sufficient number of successful transactions, the payer is treated as a "trusted payer", and the routing scores of transactions associated with the payer may be adjusted to make it more likely that they are routed to the priority processing network.

Figure 3:
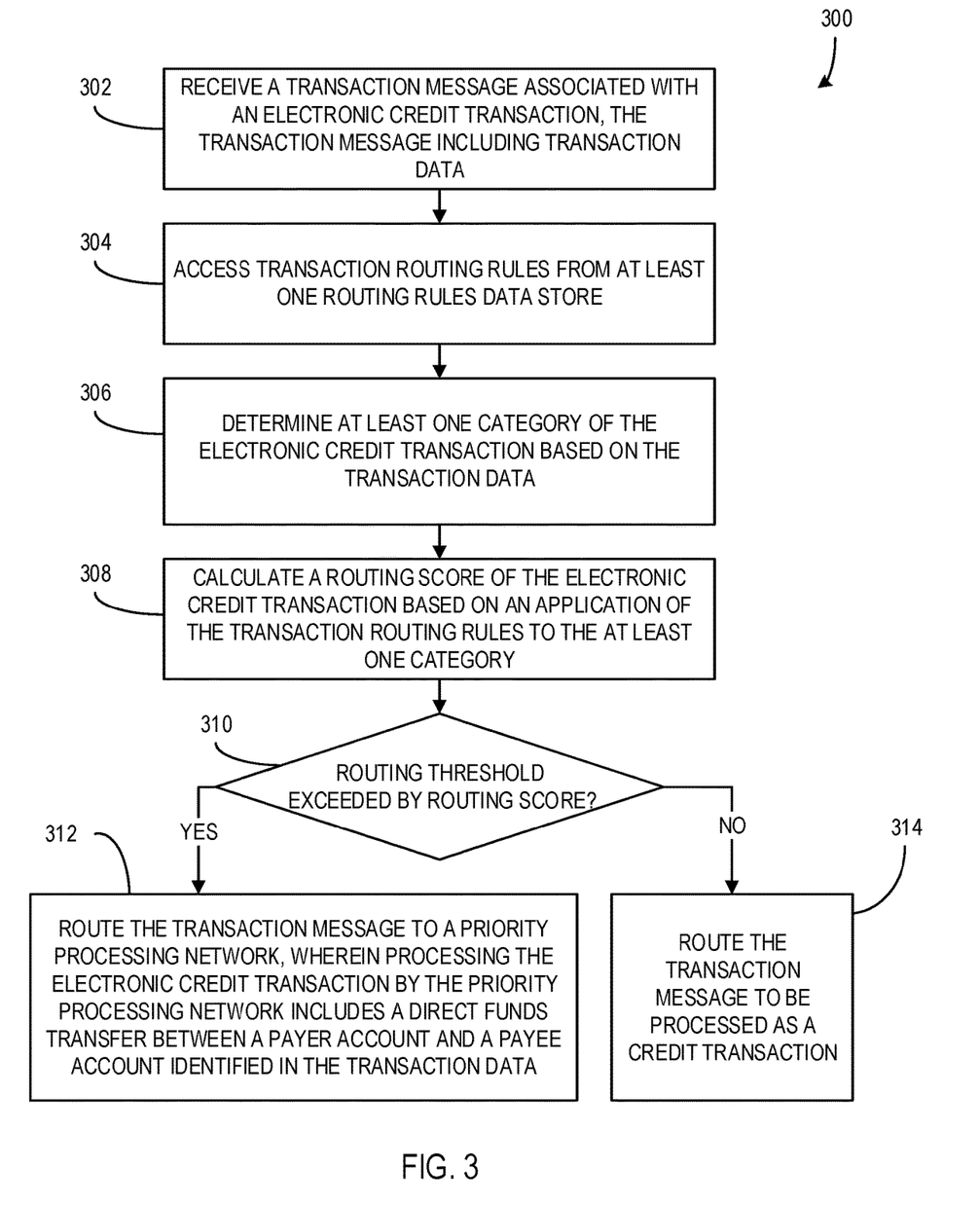
FIG. 3 is an exemplary flow chart illustrating routing an electronic transaction to a priority processing network based on a calculated routing score according to an embodiment.

FIG. 3 is an exemplary flow chart 300 illustrating routing an electronic transaction to a priority processing network based on a calculated routing score according to an embodiment. In some examples, the system 100 of FIG. 1 and/or the priority routing engine 210 of FIG. 2 are configured to implement the process described by flow chart 300. At 302, a transaction message (e.g., transaction message 216, etc.) associated with an electronic credit transaction is received. The received transaction message includes transaction data (e.g., transaction data 217, etc.). The transaction may further include payer data, transaction context data, and/or other transaction parameters. In some examples, the transaction message is received by a priority routing engine (e.g., priority routing engine 210, etc.) at a payment network. The transaction message may originate at a physical or online merchant location and it may be transmitted through a credit transaction processing infrastructure as would be understood by a person of ordinary skill in the art, including passing from the merchant location to a bank or other financial institution associated with the merchant, and then passing to the payment network for processing as described herein.

At 304, transaction routing rules (e.g., routing rules 224, etc.) are accessed from at least one routing rules data store. At 306, at least one category of the electronic credit transaction is determined based on the transaction data. In some examples, determining a category or categories of the electronic credit transaction includes extracting transaction data from the transaction message and comparing it to transaction category data associated with the priority routing engine. When extracted transaction data matches or otherwise aligns with subsets of the transaction category data, the associated transaction may be considered to be in the transaction category. For instance, a "trusted payer" transaction category may be defined based on a stored list of trusted payers based on payer identifiers and/or account identifiers associated with payers, etc. Payer data of a transaction message is extracted by the priority routing engine and, if the extracted payer data includes a payer identifier and/or an account identifier that matches the stored list of trusted players, the associated transaction may be classified in a "trusted payer" category. In an alternative example, a "disaster relief" transaction category may be defined based on a list of identifiers of known disaster relief funds and/or a transaction code that indicates the transaction is a donation. If extracted merchant data and/or transaction code data aligns with the disaster relief transaction category data, the transaction may be classified in a "disaster relief" category.

At 308, a routing score of the electronic credit transaction is calculated based on an application of the transaction routing rules to the at least one category. In some examples, the routing score is increased and/or decreased based on the evaluation of the transaction routing rules with respect to the category or categories of the transaction. The routing rules evaluated may be routing rules that are triggered by the transaction categories of the transaction (e.g., when a transaction is a "trusted payer" transaction, increase the routing score by five, etc.). Alternatively, or additionally, the routing rules may be selected for evaluation based on the transaction categories while evaluation may be based on other transaction data (e.g., when a transaction is a "preferred merchant" transaction, a routing rule based on the transaction amount is applied that, when satisfied, increases the routing score by three, etc.). Further, the routing rules may be layered, such that the evaluation of one routing rule may trigger the evaluation of one or more other routing rules.

In some examples, the determination of categories of a transaction may be as a result of evaluation of routing rules specific to the possible categories. In such examples, the determination of categories and the calculation of a routing score based on the routing rules may be a set of operations as described herein, such that rules associated with determining categories are evaluated and then, as a result of those evaluations, routing rules for calculating routing scores are evaluated (e.g., routing rules for identifying transactions that are "preferred merchant" transactions are evaluated first, and if a transaction is a "preferred merchant" transaction, a routing rule associated with the preferred merchant transaction category is evaluated to determine if the payer is trusted by the merchant and adjust the routing score accordingly.

If, at 310, a routing threshold is exceeded by the calculated routing score, the transaction message is routed to a priority processing network at 312. The routing threshold may be a value that is defined within the priority routing engine as described herein. Further, the routing threshold that is compared to the routing score may be determined from a set of possible routing thresholds. The determined routing threshold may be specific to a merchant of the transaction, a category of the transaction, a date/time of the transaction, a location of the transaction, or the like.

The processing of the electronic credit transaction by the priority processing network at 312 includes a direct funds transfer between a payer account and a payee account identified in the transaction data. In some examples, the processing may include use of ACH same-day transaction processing or real-time transaction processing (e.g., using VOCALINK, etc.). The processing methods may include other direct funds transfer methods as would be understood by a person of ordinary skill in the art without departing from the description herein.

Alternatively, if the routing threshold is not exceeded by the calculated routing score, the transaction is routed to be processed as a credit transaction (e.g., routed to credit issuer network 112, etc.) at 314.

Figure 4:
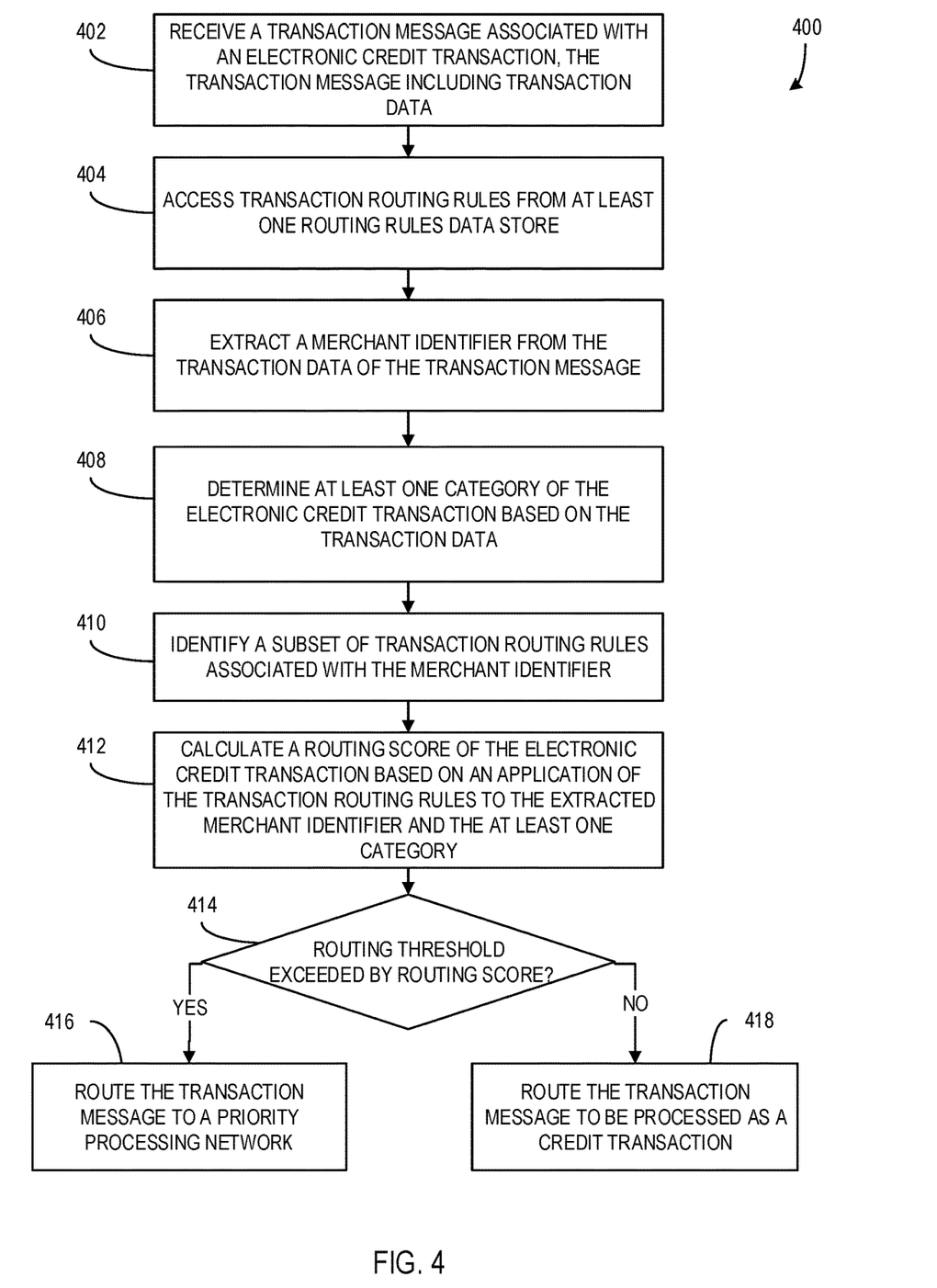
FIG. 4 is an exemplary flow chart illustrating routing an electronic transaction to a priority processing network based on an extracted merchant identifier and a calculated routing score according to an embodiment.

FIG. 4 is an exemplary flow chart 400 illustrating routing an electronic transaction to a priority processing network based on an extracted merchant identifier and a calculated routing score according to an embodiment. In some examples, the system 100 of FIG. 1 and/or the priority routing engine 210 of FIG. 2 are configured to implement the process described by flow chart 400. At 402-404, The transaction message is received and transaction routing rules are accessed in substantially the same manner as described above with respect to 302-304 of FIG. 3. At 406, a merchant identifier is extracted from the transaction data of the transaction message. In some examples, the merchant identifier is extracted by a transaction data extractor (e.g., transaction data extractor 232, etc.) of a priority routing engine (e.g., priority routing engine 210, etc.) as described herein. The merchant identifier may be translated, decrypted, or otherwise transformed for use by the priority routing engine. The extracted merchant identifier may include data identifying a merchant organization, a specific merchant store location, or a combination of identification data.

At 408, at least one category of the electronic credit transaction is determined based on the transaction data. It should be understood that the at least one category is determined in substantially the same manner as described above with respect to 306 of FIG. 3.

At 410, a subset of transaction routing rules associated with the merchant identifier is identified. The routing rules may be stored in a data store and include a mapping of merchant identifiers to routing rules, such that the mapped routing rules are only evaluated when a transaction including the associated merchant identifier is received. A merchant identifier may be associated with one or more routing rules and/or a routing rule may be associated with one or more merchant identifiers. In some examples, in addition to identifying merchant-specific routing rules, non-specific routing rules may also be identified for evaluation (e.g., a set of general and/or default routing rules, etc.).

At 412, a routing score of the electronic credit transaction is calculated in substantially the same manner as described above with respect to 308 of FIG. 3. Additionally, the calculated routing score is further based on the extracted merchant identifier in addition to the at least one category of the transaction. As described herein, routing rules may be selected, evaluated, and/or satisfied based on the extracted merchant identifier, the at least one category, or a combination of the two.

After the routing score is calculated, it is compared to a routing threshold at 414 and, if the routing score exceeds the routing threshold, the transaction message is routed to a priority processing network at 416. Alternatively, if the routing score does not exceed the routing threshold, the transaction message is routed to be processed as a credit transaction at 418. It should be understood that the comparison of the routing score to the routing threshold and the routing of the transaction message based thereon are performed in substantially the same manner as 310-314 of FIG. 3 described above.

Additional Example Scenarios

Aspects of the disclosure enable various additional scenarios, such as next described.

In an example, a priority routing engine receives a transaction message associated with a transaction between a payer and a merchant that originated at a physical POS of the merchant. The priority routing engine analyzes the transaction data included with the transaction message and categorizes the transaction as a "preferred merchant" transaction based on the comparison of an extracted merchant identifier with a stored list of preferred merchant identifiers. The priority routing engine applies a routing rule that indicates preferred merchant transactions should be automatically routed to the priority processing network. Because the transaction is a preferred merchant transaction, a positive priority processing indicator is included in the transaction message and it is routed to the priority processing network for processing. The priority processing network processes the network such that a direct funds transfer is initiated between an account of the payer and an account of the merchant.

In another example, the priority routing engine receives a transaction message associated with another preferred merchant. A first routing rule indicates that, when a transaction is a preferred merchant transaction, the routing score of the transaction should be increased by ten. The routing score of the transaction begins at zero, so after application of the first routing rule, the routing score of the transaction is ten. A second routing rule indicates that, if the transaction amount exceeds $1000, the routing score of the transaction should be reduced by three (e.g., larger transactions may require security processes of the standard credit issuer network processing, etc.). The routing score of the transaction is adjusted down to seven. The routing threshold associated with the merchant identifier of the preferred merchant is nine and, because the routing score of the transaction is less than the routing threshold, the transaction is routed to a credit issuer network for processing.

In yet another example, a payer makes a contribution to a recently created charitable organization that works on hurricane relief projects. Upon receipt of the transaction message, the priority routing engine extracts merchant information about the charitable organization and payer information associated with the payer. In order to categorize the transaction, the priority routing engine accesses transaction history data associated with the merchant and some recent public social media posts made by the payer. A post by the payer is identified that states "I'm excited to support the charitable organization to help with hurricane relief efforts!". Further, the priority routing engine determines that other transactions associated with the charitable organization have been classified as charitable contribution transactions. Based on the accessed data points, the priority routing engine determines that the transaction is very likely to be charitable contribution transaction. The priority routing engine applies routing rules associated with charitable contributions to the transaction and, based on the evaluation of the routing rules, calculates a routing score of eleven. The default routing threshold of the priority routing engine is ten, so the transaction is routed to a priority processing network for processing.

Exemplary Operating Environment

Figure 5:
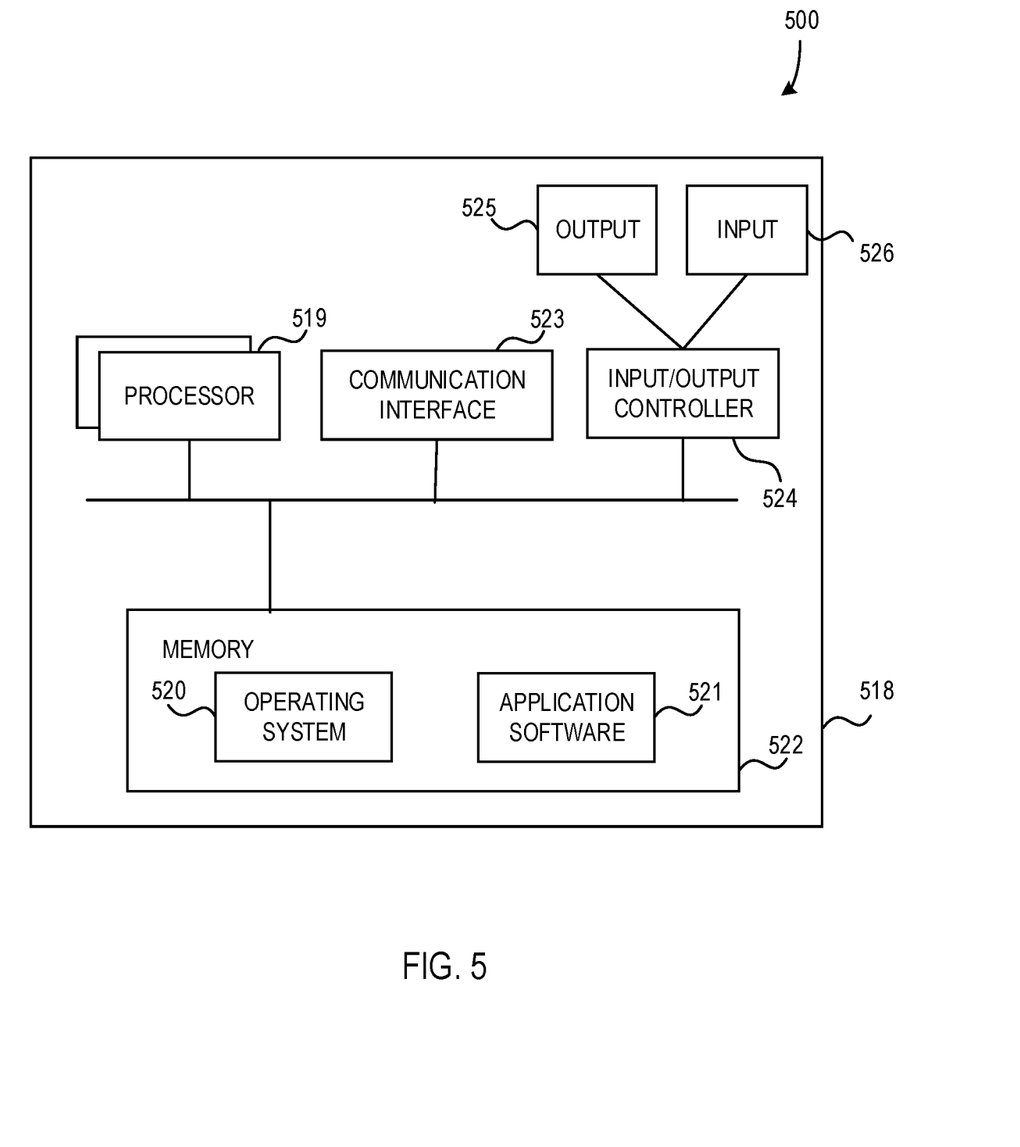
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Platform software comprising an operating system 520 or any other suitable platform software may be provided on the apparatus 518 to enable application software 521 to be executed on the device. According to an embodiment, routing transactions to a priority processing network as described herein may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein.

Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for prioritizing processing of transactions comprising:
at least one processor;
at least one network interface; and
at least one memory comprising computer program code, the at least one memory and the computer program code configured to, with the at least one processor, cause the at least one processor to:
receive, via the network interface, a transaction message associated with an electronic credit transaction, the transaction message including transaction data;
access transaction routing rules from at least one routing rules data store;
determine at least one category of the electronic credit transaction based on the transaction data;
calculate a routing score of the electronic credit transaction based on an application of the transaction routing rules to the at least one category; and
based on the routing score, route the transaction message, via the network interface, to a priority processing network, wherein processing the electronic credit transaction by the priority processing network includes a direct funds transfer between a payer account and a payee account identified in the transaction data.

the at least one memory and the computer program code configured to, with the at least one processor, further cause the at least one processor to extract a merchant identifier from the transaction data of the transaction message;
wherein calculating the routing score of the electronic credit transaction is further based on an application of the transaction routing rules to the extracted merchant identifier.
wherein the transaction routing rules include a subset of transaction routing rules associated with the extracted merchant identifier;
wherein, based on the extracted merchant identifier, calculating the routing score includes applying the subset of transaction routing rules to the at least one category.
wherein routing the transaction message to the priority processing network is based on the extracted merchant identifier satisfying a routing rule associated with a set of priority merchant identifiers.
wherein determining at least one category of the electronic credit transaction includes accessing category parameter data from at least one data store based on the transaction data and determining categories based on the category parameter data.
wherein the at least one data store includes at least one of a merchant data store, a transaction category data store, or an external data store.

wherein the category parameter data includes data associated with at least one of a healthcare category, a disaster relief category, a charitable cause category, or a trusted payer category.
wherein determining that the electronic credit transaction is in the trusted payer category includes accessing transaction history data associated with a payer of the electronic credit transaction and determining that a number of completed transactions between the payer and a merchant of the electronic credit transaction in the transaction history data exceeds a trusted payer transaction threshold.
wherein routing the transaction message to the priority processing network is based on the routing score exceeding a routing threshold; and
wherein the at least one memory and the computer program code configured to, with the at least one processor, further cause the at least one processor to route the transaction, via the network interface, to a credit issuer network based on the routing threshold exceeding the routing score, whereby the electronic credit transaction is processed as a credit transaction.
the at least one memory and the computer program code configured to, with the at least one processor, further cause the at least one processor to:
receive feedback data indicating that routing the transaction message to the priority processing network was correct or incorrect; and
based on the received feedback data, adjusting the transaction routing rules using at least one machine learning technique.

A computerized method for prioritizing processing of transactions, the method comprising:
receiving, by a processor, a transaction message associated with an electronic credit transaction, the transaction message including transaction data;
accessing, by the processor, transaction routing rules from at least one routing rules data store;
extracting, by the processor, a merchant identifier from the transaction data of the transaction message;
determining, by the processor, at least one category of the electronic credit transaction based on the transaction data;
calculating, by the processor, a routing score of the electronic credit transaction based on an application of the transaction routing rules to the merchant identifier and the at least one category; and
based on the routing score, processing the electronic credit transaction via a priority processing network, whereby funds are transferred directly between a payer account and a payee account identified in the transaction data.

wherein the transaction routing rules include a subset of transaction routing rules associated with the extracted merchant identifier;
wherein, based on the extracted merchant identifier, calculating the routing score includes applying the subset of transaction routing rules to the at least one category.
wherein routing the transaction message to the priority processing network is based on the extracted merchant identifier satisfying a routing rule associated with a set of priority merchant identifiers.
wherein determining at least one category of the electronic credit transaction includes accessing category parameter data from at least one data store based on the transaction data and determining categories based on the category parameter data.

wherein the at least one data store includes at least one of a merchant data store, a transaction category data store, or an external data store.

wherein the category parameter data includes data associated with at least one of a healthcare category, a disaster relief category, a charitable cause category, or a trusted payer category.

wherein determining that the electronic credit transaction is in the trusted payer category includes accessing transaction history data associated with a payer of the electronic credit transaction and determining that a number of completed transactions between the payer and a merchant of the electronic credit transaction in the transaction history data exceeds a trusted payer transaction threshold.

One or more computer storage media having computer-executable instructions for prioritizing processing of transactions that, upon execution by a processor, cause the processor to at least:
  receive, via a network interface, a transaction message associated with an electronic credit transaction, the transaction message including transaction data; access transaction routing rules from at least one routing rules data store;
  extract a merchant identifier from the transaction data of the transaction message; determine at least one category of the electronic credit transaction based on the transaction data;
  calculate a routing score of the electronic credit transaction based on an application of the transaction routing rules to the merchant identifier and the at least one category; and
  based on the routing score, route the transaction message, via the network interface, to a priority processing network, wherein processing the electronic credit transaction by the priority processing network includes a direct funds transfer between a payer account and a payee account identified in the transaction data.
  wherein the transaction routing rules include a subset of transaction routing rules associated with the extracted merchant identifier;
  wherein, based on the extracted merchant identifier, calculating the routing score includes applying the subset of transaction routing rules to the at least one category.
  wherein routing the transaction message to the priority processing network is based on the extracted merchant identifier satisfying a routing rule associated with a set of priority merchant identifiers.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving a transaction message associated with an electronic credit transaction, the transaction message including transaction data, means for accessing transaction routing rules from at least one routing rules data store, means for determining at least on category of electronic credit transaction based on the transaction data; means for calculating a routing score of the electronic credit transaction based on an application of the transaction routing rules to the at least one category, and a means of routing the transaction message to a priority processing network based on the routing score, wherein processing the electronic credit transaction by the priority processing network includes a direct funds transfer between a payer account and a payee account identified in the transaction data. The illustrated one or more processors 519 together with the computer program code stored in memory 522 constitute exemplary processing means for extracting and transforming transaction data from a transaction message, determining transaction categories, and evaluating routing rules to calculate a routing score as described herein.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for selectively bypassing standard credit transaction processing to accelerate completion of an electronic credit transaction, the system comprising:
- at least one processor;
- at least one network interface; and
- at least one memory comprising computer program code, the at least one memory and the computer program code configured to, with the at least one processor, cause the at least one processor to:
- receive, via the network interface, a transaction message associated with the electronic credit transaction, the transaction message including transaction data;
- access transaction routing rules from at least one routing rules data store;
- determine a trusted payer category of the electronic credit transaction at least by determining that a number of completed transactions between a payer and a payee of electronic credit transactions in transaction history data exceeds a trusted payer transaction threshold;
- calculate a routing score of the electronic credit transaction based on an application of the transaction routing rules to the determined trusted payer category;
- compare the calculated routing score to a routing threshold;
- based on the comparing, determine whether to route the electronic credit transaction to a priority processing network or to a credit issuer network for processing, wherein processing the electronic credit transaction by the priority processing network causes a direct funds transfer between a payer account and a payee account on a same day on which the transaction message is received, and wherein processing the electronic credit transaction by the credit issuer network causes the funds transfer between the payer account and the payee account to occur after more than one day;
- based on the determining, route the transaction message, via the network interface, to the priority processing network for processing;
- access training data pairs from a machine learning data structure;
- train a machine learning component using the accessed training data pairs;
- receive feedback data indicating that routing the transaction message to the priority processing network was correct or incorrect; and
- input the received feedback data to the trained machine learning component to determine an adjusted value of the routing threshold wherein the adjusted value of the routing threshold is used for a future electronic credit transaction.

2. The system of claim 1, the at least one memory and the computer program code configured to, with the at least one processor, further cause the at least one processor to:
- extract a payee identifier from the transaction data;
- determine whether the payee identifier is included in a list of preferred payees; and
- calculate the routing score of the electronic credit transaction based on the determining.

3. The system of claim 1, the at least one memory and the computer program code configured to, with the at least one processor, further cause the at least one processor to: select one or more routing rules of the transaction routing rules based on the trusted payer category and applying the selected one or more routing rules to the transaction data.

4. The system of claim 1, wherein routing the transaction message to the priority processing network is based on an extracted payee identifier satisfying a routing rule associated with a set of priority payee identifiers.

5. The system of claim 1, wherein determining a trusted payer category of the electronic credit transaction includes determining a type of the electronic credit transaction and determining at least one category based on the determined type of the electronic credit transaction.

6. The system of claim 1, wherein the application of the transaction routing rules includes applying nested rules such that upon a first rule being satisfied one or more second rules are applied to calculate the routing score.

7. The system of claim 1, wherein determining a trusted payer category of the electronic credit transaction includes accessing category parameter data from at least one data store based on the transaction data and wherein the category parameter data includes data associated with the trusted payer category.

8. The system of claim 1, the at least one memory and the computer program code configured to, with the at least one processor, further cause the at least one processor to:
- determine a quantity of transaction messages that were routed incorrectly out of a total quantity of transaction messages routed in a given period of time; and
- input the determined quantity of the transaction messages that were routed incorrectly out of a total quantity of transaction messages routed in a given period of time to the trained machine learning component to adjust the transaction routing rules.

9. A computerized method for selectively bypassing standard credit transaction processing to accelerate completion of an electronic credit transaction, the method comprising:
- receiving, by a processor, a transaction message associated with the electronic credit transaction, the transaction message including transaction data;
- accessing, by the processor, transaction routing rules from at least one routing rules data store;
- determining, by the processor, a trusted payer category of the electronic credit transaction at least by determining that a number of completed transactions between a payer and a payee of electronic credit transactions in transaction history data exceeds a trusted payer transaction threshold;
- calculating, by the processor, a routing score of the electronic credit transaction based on an application of the transaction routing rules to the determined trusted payer category;
- comparing the calculated routing score to a routing threshold;
- based on the comparing, determining whether to route the electronic credit transaction to a credit issuer network or a priority processing network, wherein processing the electronic credit transaction by the priority processing network causes a direct funds transfer between a payer account and a payee account on a same day on which the transaction message is received, and wherein processing the electronic credit transaction by the credit issuer network causes the funds transfer between the payer account and the payee account to occur after more than one day;

based on the determining, routing the transaction message, via a network interface, to the priority processing network for processing;
accessing training data pairs from a machine learning data structure;
training a machine learning component using the accessed training data pairs;
receiving feedback data indicating that routing the transaction message to the priority processing network was correct or incorrect; and
inputting the received feedback data to the trained machine learning component to determine an adjusted value of the routing threshold wherein the adjusted value of the routing threshold is used for a future electronic credit transaction.

10. The computerized method of claim 9, the method further comprising:
extracting a payee identifier from the transaction data;
determining whether the payee identifier is included in a list of preferred payees; and
calculating the routing score of the electronic credit transaction based on the determining.

11. The computerized method of claim 10, wherein routing the transaction message to the priority processing network is based on the extracted payee identifier satisfying a routing rule associated with a set of identifiers of priority payees.

12. The computerized method of claim 9, wherein determining a trusted payer category of the electronic credit transaction includes determining a type of the electronic credit transaction and determining at least one category based on the determined type of the electronic credit transaction.

13. The computerized method of claim 9, wherein the application of the transaction routing rules includes applying nested rules such that upon a first rule being satisfied one or more second rules are applied to calculate the routing score.

14. The computerized method of claim 9, the method further comprising: selecting one or more routing rules of the transaction routing rules based on the trusted payer category and applying the selected one or more routing rules to the transaction data.

15. The computerized method of claim 9, wherein determining a trusted payer category includes accessing category parameter data from at least one data store based on the transaction data and wherein the category parameter data includes data associated with the trusted payer category.

16. One or more non-transitory computer storage media having computer-executable instructions for selectively bypassing standard credit transaction processing to accelerate completion of an electronic credit transaction that, upon execution by a processor, cause the processor to at least:
receive, via a network interface, a transaction message associated with the electronic credit transaction, the transaction message including transaction data;
access transaction routing rules from at least one routing rules data store;
determine a trusted payer category of the electronic credit transaction at least by determining that a number of completed transactions between a payer and a payee of electronic credit transactions in transaction history data exceeds a trusted payer transaction threshold;
calculate a routing score of the electronic credit transaction based on an application of the transaction routing rules to the determined trusted payer category;
compare the calculated routing score to a routing threshold;
based on the comparing, determine whether to route the electronic credit transaction to a priority processing network or to a credit issuer network, wherein processing the electronic credit transaction by the priority processing network causes a direct funds transfer between a payer account and a payee account on a same day on which the transaction message is received, and wherein processing the electronic credit transaction by the credit issuer network causes the funds transfer between the payer account and the payee account to occur after more than one day;
based on the determining, route the transaction message via the network interface, to the priority processing network for processing;
access training data pairs from a machine learning data structure;
train a machine learning component using the accessed training data pairs;
receive feedback data indicating that routing the transaction message to the priority processing network was correct or incorrect; and
input the received feedback data to the trained machine learning component to determine an adjusted value of the routing threshold wherein the adjusted value of the routing threshold is used for a future electronic credit transaction.

17. The one or more non-transitory computer storage media of claim 16, wherein the computer-executable instructions for selectively bypassing standard credit transaction processing to accelerate completion of an electronic credit transaction that, upon execution by a processor, further cause the processor to at least:
extract a payee identifier from the transaction data;
determine whether the payee identifier is included in a list of preferred payees; and
calculate the routing score of the electronic credit transaction based on the determining.

18. The one or more non-transitory computer storage media of claim 16, wherein the computer-executable instructions for selectively bypassing standard credit transaction processing to accelerate completion of an electronic credit transaction that, upon execution by a processor, further cause the processor to at least: select one or more routing rules of the transaction routing rules based on the trusted payer category and applying the selected one or more routing rules to the transaction data.

19. The one or more non-transitory computer storage media of claim 16, wherein routing the transaction message to the priority processing network is based on an extracted payee identifier satisfying a routing rule associated with a set of priority payee identifiers.

20. The one or more non-transitory computer storage media of claim 16, wherein the application of the transaction routing rules includes applying nested rules such that upon a first rule being satisfied one or more second rules are applied to calculate the routing score.

* * * * *